United States Patent [19]

Bucknell

[11] Patent Number: 5,046,906
[45] Date of Patent: Sep. 10, 1991

[54] FORCE APPLICATORS

[76] Inventor: John W. Bucknell, Unit 5/11 Sevenoaks Street, Taringa, Queensland, 4086, Australia

[21] Appl. No.: 478,009
[22] PCT Filed: Sep. 29, 1988
[86] PCT No.: PCT/AU88/00381
 § 371 Date: May 7, 1990
 § 102(e) Date: May 7, 1990
[87] PCT Pub. No.: WO89/02807
 PCT Pub. Date: Apr. 6, 1989

[30] Foreign Application Priority Data

Sep. 29, 1987 [AU] Australia ................. PI4642

[51] Int. Cl.⁵ .......................................... F16B 37/08
[52] U.S. Cl. ................... 411/432; 411/916; 411/917
[58] Field of Search ............... 411/432, 433, 383, 916, 411/917, 427, 434

[56] References Cited

U.S. PATENT DOCUMENTS 2,571,265 10/1951 Leufven .
3,154,006 10/1964 Novak ................. 411/432
3,837,694 9/1974 Frisch ................. 411/916
3,841,193 10/1974 Ito ..................... 411/916
4,075,923 2/1978 Latham ................. 411/916
4,085,649 4/1978 Christensson .......... 411/916
4,854,798 8/1989 Snyder et al. .......... 411/916

FOREIGN PATENT DOCUMENTS

79085/87 3/1988 Australia .
2161093 6/1973 Fed. Rep. of Germany .
2205019 8/1973 Fed. Rep. of Germany .
2356604 5/1975 Fed. Rep. of Germany .
1204925 9/1970 United Kingdom ....... 411/432
1584158 2/1981 United Kingdom .

Primary Examiner—Neill R. Wilson
Attorney, Agent, or Firm—Foley & Lardner

[57] ABSTRACT

A hydraulic nut (20) for tensioning a bolt (232) is disclosed having a stepped annular piston (22) slidable within a housing (21) for reducing the complexity of manufacture. The locking collar (27) is threaded to the housing (21) on a buttress thread (28) to minimize distortion due to thread loads and locks against the piston (22) instead of the clamped article for minimizing tensile relaxation during transfer of load from the hydraulic tensioner to the locking collar (27).

7 Claims, 8 Drawing Sheets

FORCE APPLICATORS

BACKGROUND OF THE INVENTION

This invention relates to improved force application apparatus.

This invention has particular but not exclusive application to the preloading of mechanical elements, and for illustrative purposes reference will be made to such application. However, it is to be understood that this invention could be used in other applications, such as the raising of loads.

In the assembly of machinery, it is often difficult to apply the necessary preloads to bolts, studs, shafts and bearings by the use of conventional screwed fasteners, particularly in the case of large machine elements. Hitherto, force applicators of the type using hydraulic pressure to apply preload to machine elements have suffered from a number of drawbacks. They must be pressurised by expensive, specialised pumps and their component shapes render them difficult to construct. Often the configuration of available applicators results in their being inconvenient to use in situations which occur frequently in the assembly and dismantling of machine components.

DESCRIPTION OF THE PRIOR ART

Tensioning nuts for bolts or studs which include hydraulic tensioners are known, but their form and constructional features result in high manufacturing costs, rendering them useful only in a limited number of applications where their high cost can be justified. Further, the constructional features of current tensioning nut designs result in the generation of undesirably high stresses and deflections within the apparatus, requiring the use of expensive materials and rendering the hydraulic seals susceptible to leakage.

A further problem with current designs of tensioning nut is that differential deflections which occur within the apparatus during the transition from hydraulic tension to mechanical locking with a threaded collar or the like result in a relaxation in the applied tension.

The present invention aims to alleviate the above disadvantages and to provide force application means which will be reliable and efficient in use. Other objects and advantages of this invention will hereinafter become apparent.

SUMMARY OF THE INVENTION

With the foregoing and other objects in view, this invention in one aspect resides broadly in force application apparatus for applying a load to a tensile member relative to a clamping surface through which the tensile member projects, said force application apparatus including:

an annular housing having an annular recess extending inwardly from an end face of said housing;

a piston assembly slidable within said annular recess and sealed thereto;

locating means for locating said force application apparatus about the tensile member, and pressure application means for applying pressurised fluid to said annular recess to displace said piston relative to said housing.

Preferably the annular recess is a stepped recess having a minor bore disposed along the housing from a major bore and an intermediate step which forms a housing pressure face and wherein the annular piston is a stepped piston having a circular major piston wall and a circular minor piston wall slidably engageable with the minor and major bores respectively and sealed thereto by minor and major sealing means respectively, the stepped piston having an intermediate step between the piston walls which forms a piston pressure face which opposes the housing pressure face. The location means may include an internal thread formed in the annular housing or the annular piston and adapted for engagement with an externally-threaded tensile member.

The piston may include an external thread for engagement with an internally-threaded locking collar. Alternatively, if desired, the annular housing may include an external thread for engagement with an internally-threaded collar. An external locking collar may be included, and may be threadedly engaged with the external thread. The external thread may be of any desired form, but preferably it is a buttress thread having the thrust face of the thread substantially perpendicular to the axis of the thread such that minimal spreading loads are applied to the collar as a result of axial loading.

The locking collar may have a collar end face engageable with a locking face formed on the cooperating piston or annular housing such that the annular housing and the piston may be locked in a selected extended relationship with minimal load relaxation during load transfer between hydraulic extension and locking. Of course, if desired, the locking collar may be formed to permit the collar end face to engage with the clamping surface.

The internal thread may be partially formed within a reduced-diameter extension formed on the annular housing or piston on the tensile side of the internal thread, whereby elastic deflection of the extension may distribute loads between the tensile member and the internal thread over a substantial number of threads for reducing stresses.

The piston or the annular housing may include a clamping face having an inner diameter formed adjacent the internal thread such that load transfer to the clamping surface may occur directly adjacent the tensile member. However, if desired, the piston or the annular housing may include a clamping face extending substantially away from the inner diameter such that clamping pressures are minimised.

The force application apparatus may be formed with any desired sealing means between the annular housing and the piston, such as a sealing ring in a U-shaped groove. It is preferred, however, that a step-like external seal housing groove be formed between the external piston wall and the piston pressure face for supporting the external sealing means such that manufacture of the groove is simplified. The annular housing may also be formed with a step-like internal seal housing groove disposed between its minor bore and its pressure face for supporting the internal sealing means whereby manufacture may be simplified. If desired, the pressure application means may include a toroidal elastomeric bladder disposed between the housing pressure face and the piston pressure face.

The pressure application means may include a hydraulic passage formed between the annular recess and the external surface of the piston or the annular housing, and the hydraulic passage may terminate externally in a hydraulic connector such as a sealable connector or a grease nipple.

The housing pressure face may be formed of any desired size relative to the central passage. In a preferred embodiment, the area of the housing pressure face is a selected multiple of the area of the central passage within the annular housing, the multiple being selected such that a tension appropriate to the rated working load in a bolt passed through the central passage may be generated by the application to the annular recess of grease at a pressure attainable with an automotive grease gun.

In a further aspect, this invention resides in a method of tensioning a tensile member projecting through a clamping surface including:

providing force application apparatus having an annular housing including an annular recess extending inwardly from an end face of said housing, a piston assembly slidable within said annular recess and sealed thereto;

locating means for locating said force application apparatus about a tensile member projecting through a clamping surface, and pressure application means for applying pressurised fluid to said annular recess to displace said piston relative to said housing;

placing said force application apparatus about the tensile member and in contact with said clamping surface;

attaching the tensile member to said force application apparatus for operative transfer of tensile force between said force application apparatus and the tensile member, and operating said pressure application means so as to apply tensile force to said tensile member.

In another aspect, force application apparatus is disclosed including a housing and a piston slidable within a bore within said housing, said piston being forced along said bore by the application of hydraulic pressure to the piston through the medium of grease, said grease being pressurised by an automotive grease gun. Preferably, the housing is annular, and an aperture is provided for the passage of a structural component such as a bolt. The force applicator may be used to apply to the bolt a tensile load whereby components having bolt holes through which the bolt passes may be clamped together. If desired, the housing may be threaded such that it may engage with a bolt in place of a conventional nut. If desired, mechanical locking means such as threaded members may be included in the force application apparatus. The mechanical locking means may be engaged while the hydraulic pressure is applied to the piston and may maintain a preload on the bolt after the removal of the hydraulic pressure from the piston.

Preferably the threaded members are arranged to contact a clamping face of a component adjacent the bolt holes whereby high loads are concentrated in a small region of the force application apparatus such that efficient usage of structural materials may be made. In another embodiment, the threaded members may be arranged to contact the clamping face of a component in an annular configuration remote the bolt holes such that contact pressures between the threaded member and the component may be minimised. In a further embodiment, a threaded member may engage with a thread on the piston and clamp against a clamping face on the housing.

Although the piston and the bore within the housing may be of any desired configuration, it is preferred that the piston and the bore be of stepped configuration for ease of manufacture, with the pressurised grease being applied to the piston between the inner and outer bores.

Preferably, the relative sizes of piston and aperture are arranged such that a tension appropriate to the working load in the bolt may be generated by the application to the piston of grease at a pressure attainable with an automotive grease gun.

In addition to the function of producing a specific preload in a component, the force application apparatus may be utilised to force a component into a specific location along a shaft, after which the component may be locked in the desired position by screw adjusters. This function may be of particular benefit in the precise positioning and clamping of cutting tools such as slitting cutters.

If desired, the force application apparatus may be formed in a configuration such that the axial height of the apparatus is small compared to its lateral dimensions and with its end surfaces flat and parallel. A force applicator of this configuration may be passed over the shank of a bolt or stud an interposed between a clamping surface and a tensioning nut in place of a washer to permit the bolt or stud to be tensioned hydraulically.

In a further aspect, this invention resides in bearing perload apparatus including a housing and a piston slidable within a bore within said housing, said piston being forced along said bore by the application of hydraulic pressure to the piston through the medium of grease, said grease being pressurised by an automotive grease gun. Preferably, the housing is annular, and an aperture is provided for the passage of a component such as a shaft. Preferably, said preload apparatus is associated with rolling element bearings of the angular contact type, and is placed between a housing and one of a pair of angular contact bearings acting in opposition along a shaft whereby the axial preload applied to the bearings may be produced and measured. In a further embodiment, the preload apparatus may be introduced between the shaft and one of a pair of angular contact bearings acting in opposition along the shaft. The preload apparatus may be integrated into the housing or the shaft, or it may be fitted externally if desired.

In another aspect of this invention, force applicators may be integrated into the hubs of components which are mounted on shafts to provide axial mounting and demounting forces. This aspect is particularly beneficial in the case of propellers for boats, where the components must be mounted and demounted in situ without the benefit of heavy workshop equipment. If desired, separate force applictors may be provided for the mounting and the demounting processes.

In yet another aspect, this invention resides in dismountable force application apparatus which may be interposed between elements on a shaft to force them apart and which may be disassembled for removal from the shaft transversely. The dismountable force application apparatus may have a plurality of sections containing pistons which may be assembled around a shaft between components which may be required to be forced apart.

In a further aspect of this invention, pressure readout apparatus is provided in which a semiconductor pressure transducer, associated electronics, a battery and a liquid crystal readout are integrated into a plug which may be screwed into a hydraulic circuit to provide a readout of hydraulic pressure and thus of applied force.

In another aspect, this invention resides in positioning apparatus for positioning a member along a shaft, said positioning apparatus including:

an annular housing having an annular recess formed within an end face, said annular housing having a central shaft passage; an annular piston slidable within said annular recess and sealed thereto; and pressure application means for applying pressurised fluid to said annular recess.

BRIEF DESCRIPTION OF THE DRAWINGS

In order that this invention may be more easily understood and put into practical effect, reference will now be made to the accompanying drawings which illustrate a preferred embodiment of the invention, wherein.

DESCRIPTION OF THE PREFERRED EMBODIMENTS

Figure 1:
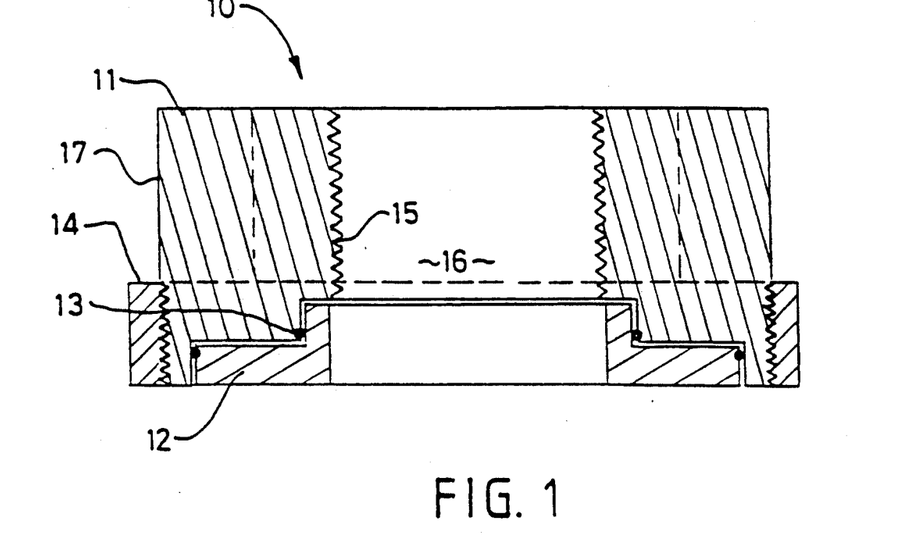
FIG. 1 is a cross-sectional view of a hydraulic nut.

The hydraulic nut assembly 10 shown in FIG. 1 has an annular housing 11 in which a stepped piston 12 slides and to which the stepped piston 12 is sealed by O-rings 13. A locking sleeve 14 is threaded onto the outside of the housing 11 and may be wound down into engagement with a clamping surface after the desired clamping force has been achieved by pressurising the stepped piston 12. A screw thread 15 engages with a bolt passing through the central hole 16, and a hexagon 17 formed on the outside of the housing 11 facilitates rotation of the assembly 10 by means of spanners.

Figure 2:
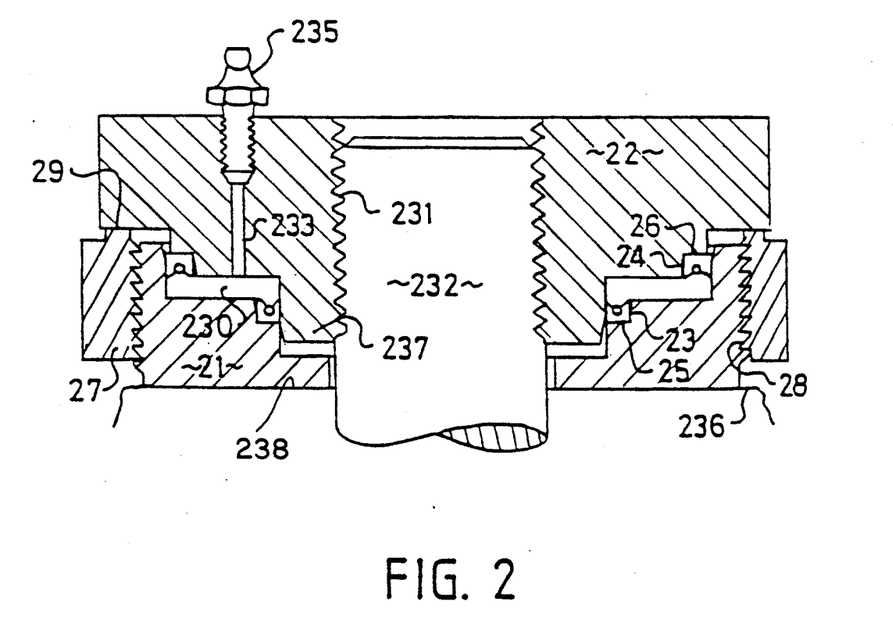
FIG. 2 is a cross-sectional view of a hydraulic nut with integrated adjusting sleeve.

The hydraulic nut assembly 20 shown in FIG. 2 has an annular housing 21 in which a stepped piston 22 slides and to which the stepped piston 22 is sealed by inner and outer self-energising seal rings 23 and 24, the seal rings 23 and 24 being located in stepped recesses 25 and 26 respectively. A locking sleeve 27 is threaded onto a buttress thread 28 along the outside of the piston 22 and may be wound up into engagement with the flange 29 of the housing 21 to lock the assembly 20 at a particular extension after the desired clamping force has been achieved by pressurising the chamber 230 between the stepped piston 22 and the housing 21. An internal screw thread 231 engages with a bolt 232.

A hydraulic passage 233 leads from the chamber 234 to a grease nipple 235 in the upper face of the piston 22. The lower section 237 of the piston 22 is of a reduced diameter relative to the bulk of the piston 22, increasing the longitudinal flexibility of the lower section 237 and thus sharing the load transfer between bolt 232 and internal thread 231 over a greater number of threads.

In use, the housing 21 with the locking collar 27 screwed down along the buttress thread 28 is placed around the shank of the bolt 232 and on a clamping surface 236 from which the bolt 232 projects. The seals 23 and 24 are placed within the housing 21 and the piston 22 is screwed down around the bolt 232 to its maximum depth within the housing 21. Pressurised hydraulic fluid is pumped into the chamber 230 through the grease nipple 235, forcing the seals 23 and 24 into the recesses 24 and 25 respectively, and then forcing the piston 22 away from the housing 21, tensioning the bolt 232. When the pressure within the chamber 230 reaches a value giving the desired preload in the bolt 232, the locking collar 27 is screwed up along the buttress thread 28 until it is locked against the flange 29.

As a consequence of their shapes, the deflections of the piston 22 and the housing 21 as a result of the hydraulic pressure within the chamber 230 and the resultant applied loads to the bolt 232 and the clamping surface 236 combine to minimise variations in the clearance between the piston 22 and the housing 21, enhancing the sealing efficiency of the seals 23 and 24, and minimising loss of tension in the bolt 232 during the transition between hydraulic tensioning and mechanical locking with the locking collar 27. The shape of the housing 21 also provides a tapering conical load path between the load-bearing upper end of the buttress thread 28 and the lower face 238 of the housing 21, enhancing the uniformity of load distribution over the lower face.

Figure 3:
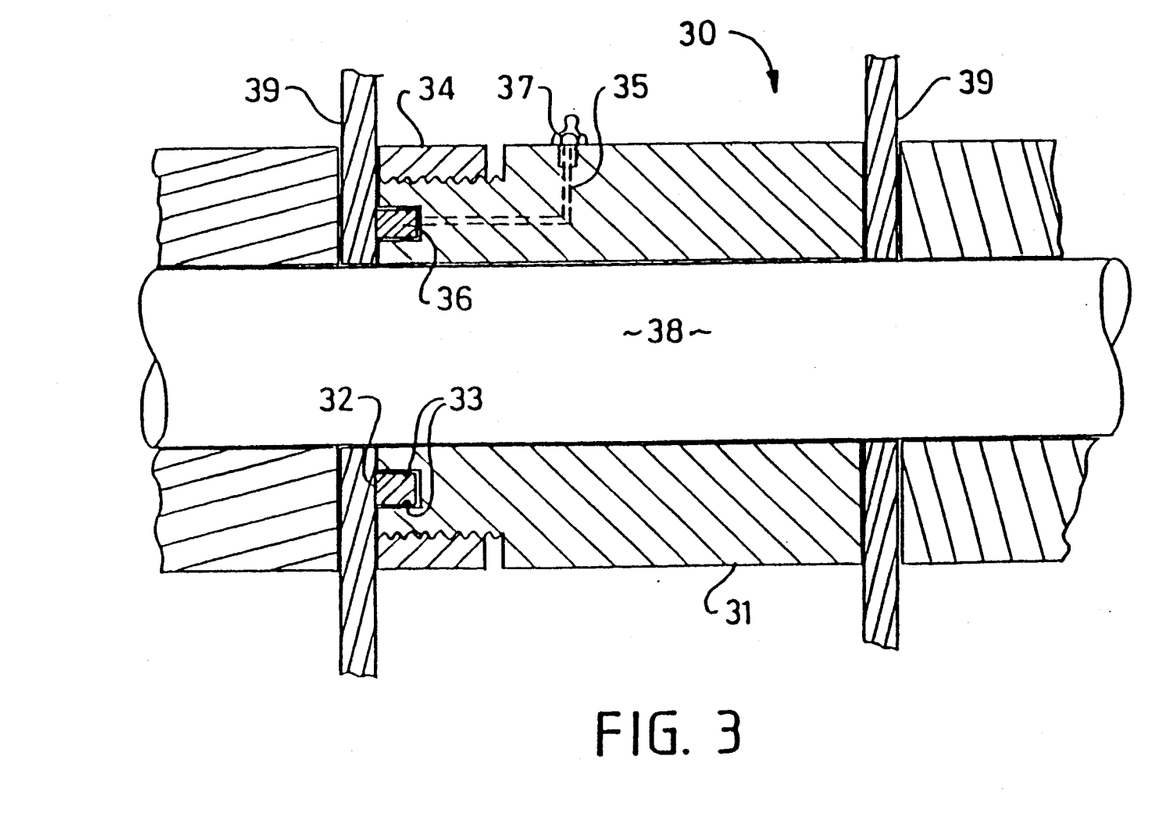
FIG. 3 is a cross-sectional view of a hydraulic positioner for a shaft.
Figure 4:
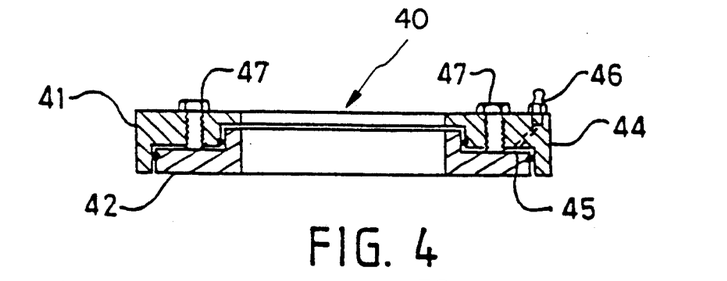
FIGS. 4 to 8 show cross-sectional views of hydraulic washers of various configurations.
Figure 5:
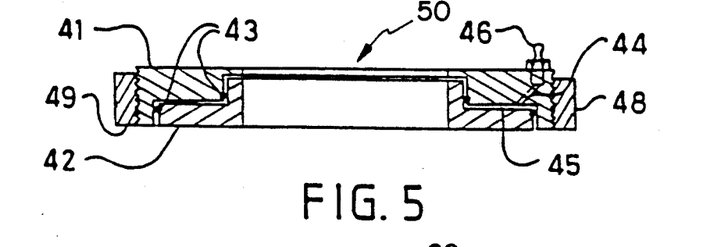
Figure 6:
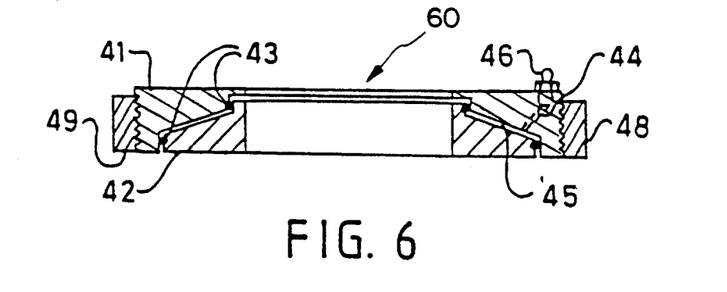
Figure 7:
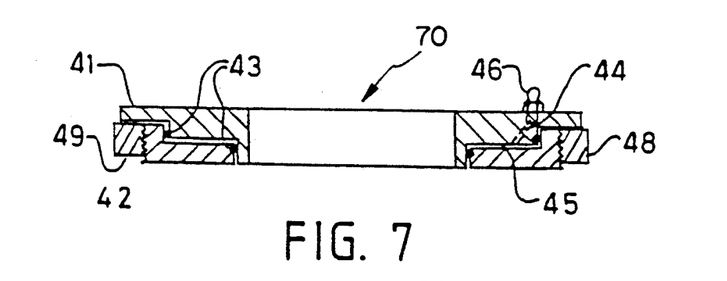
Figure 8:
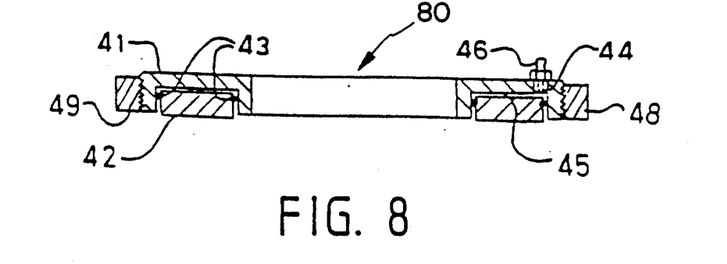

As shown in FIG. 3, the positioner assembly 30 has an annular housing 31 in which an annular piston 32 slides and to which the piston 32 is sealed by O-rings 33. A locking sleeve 34 is threaded to the outside of the housing 31. An internal passage 35 connects the annular cavity 36 in the housing 31 with a grease nipple 37.

In use, the positioner 30 is placed on a shaft 38 between slitting cutters 39. Hydraulic pressure is applied to the positioner 30 by a grease gun applied to the grease nipple 37 until the desired spacing is achieved between slitting cutters 39, and the locking ring 34 is advanced until it is in contact with the slitting cutter 39 to lock the positioner 30 at the desired length.

The washer assemblies 40, 50, 60, 70 and 80 shown in FIGS. 4 to 8 each have an annular housing 41 and a stepped piston 42, the piston 42 sliding in the housing 41 and being sealed to the housing 41 by O-rings 43. Internal passages 44 connect the annular cavities 45 within the housings 40, 50, 60, 70 and 80 to grease nipples 46. Lock bolts 47 pass through threaded holes in the housing 41 of the assembly 40 and engage with the piston 42 to lock the assembly 40 into the desired extension. Lock sleeves 48 are threaded onto the housings 41 of the assemblies 50, 60, 70 and 80 and may be rotated to bring their end faces 49 into contact with a surface to be clamped to lock the assemblies 50, 60, 70 and 80 at the desired length.

Figure 9:
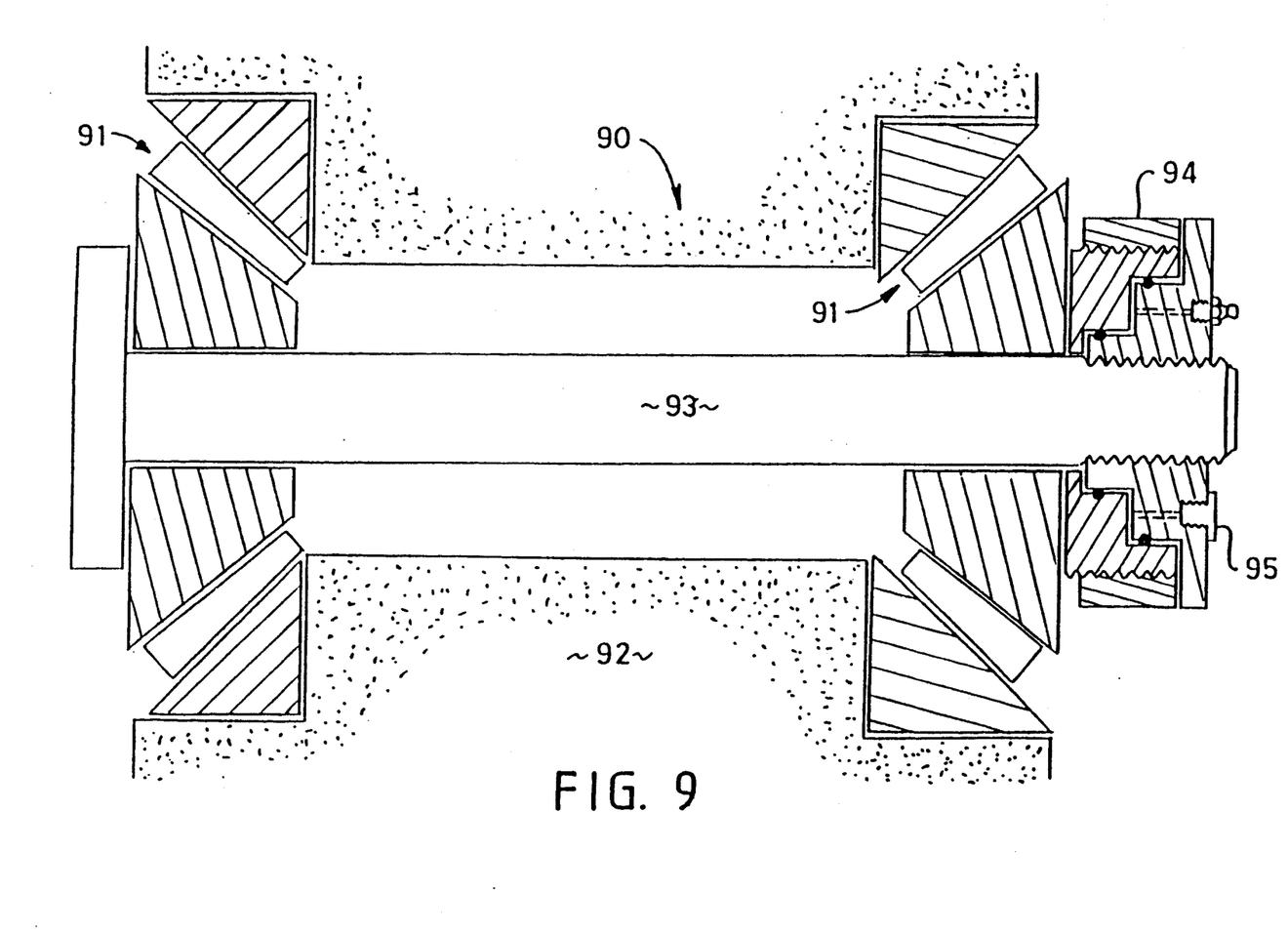
FIG. 9 is a cross-sectional view of a hydraulic preloader for bearings.

The bearing preload assembly 90 shown in FIG. 9 has a pair of angular contact bearings 91 installed in a housing 92. A shaft 93 is supported in the bearings 91 and a hydraulic preload nut 94 screws on the end of the shaft 93 and clamps the assembly 90 together. A digital pressure readout 95 screws into the housing of the preload nut 94 to provide an indication of the preload force at any time.

Figure 10:
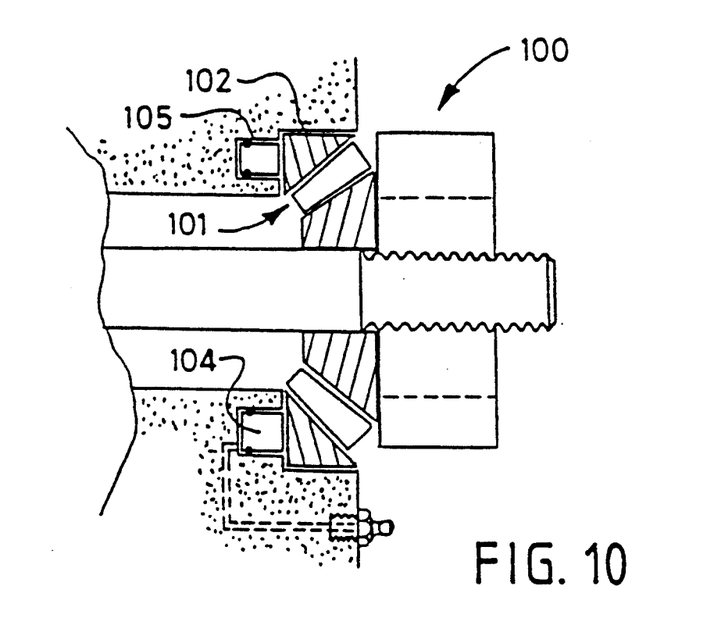
FIG. 10 is a cross-sectional view of a built-in hydraulic preloader for bearings.

The integrated preloader assembly 100 shown in FIG. 10 has the bearings 101 housed within recesses 102 in the machine frame 103, and an annular piston 104 slides within an annular cavity 105 in the frame 103 and bears against the rear face of a bearing 101.

Figure 11:
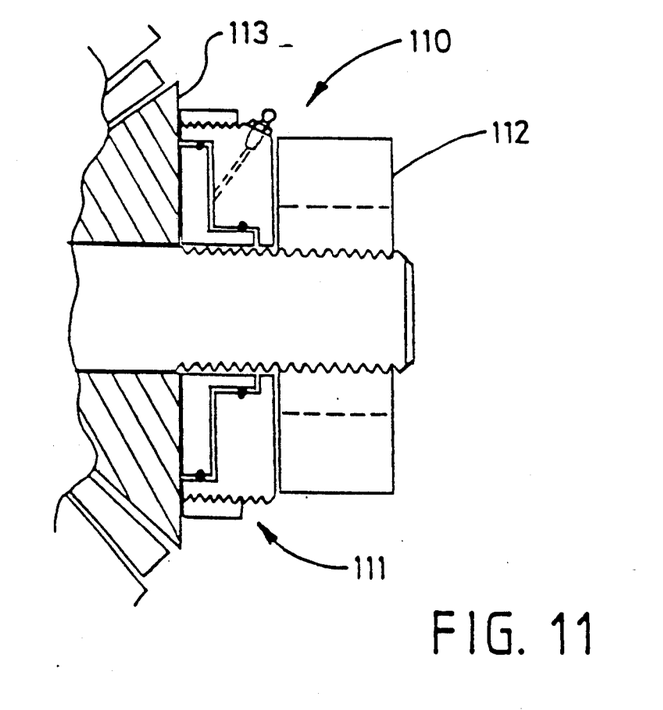
FIG. 11 is a cross-sectional view of a hydraulic washer used for bearing preload.

The preloader assembly 110 shown in FIG. 11 has a hydraulic preload washer 111 interposed between the shaft nut 112 and the bearing 113 to provide and maintain the necessary axial force on the assembly.

Figure 12:
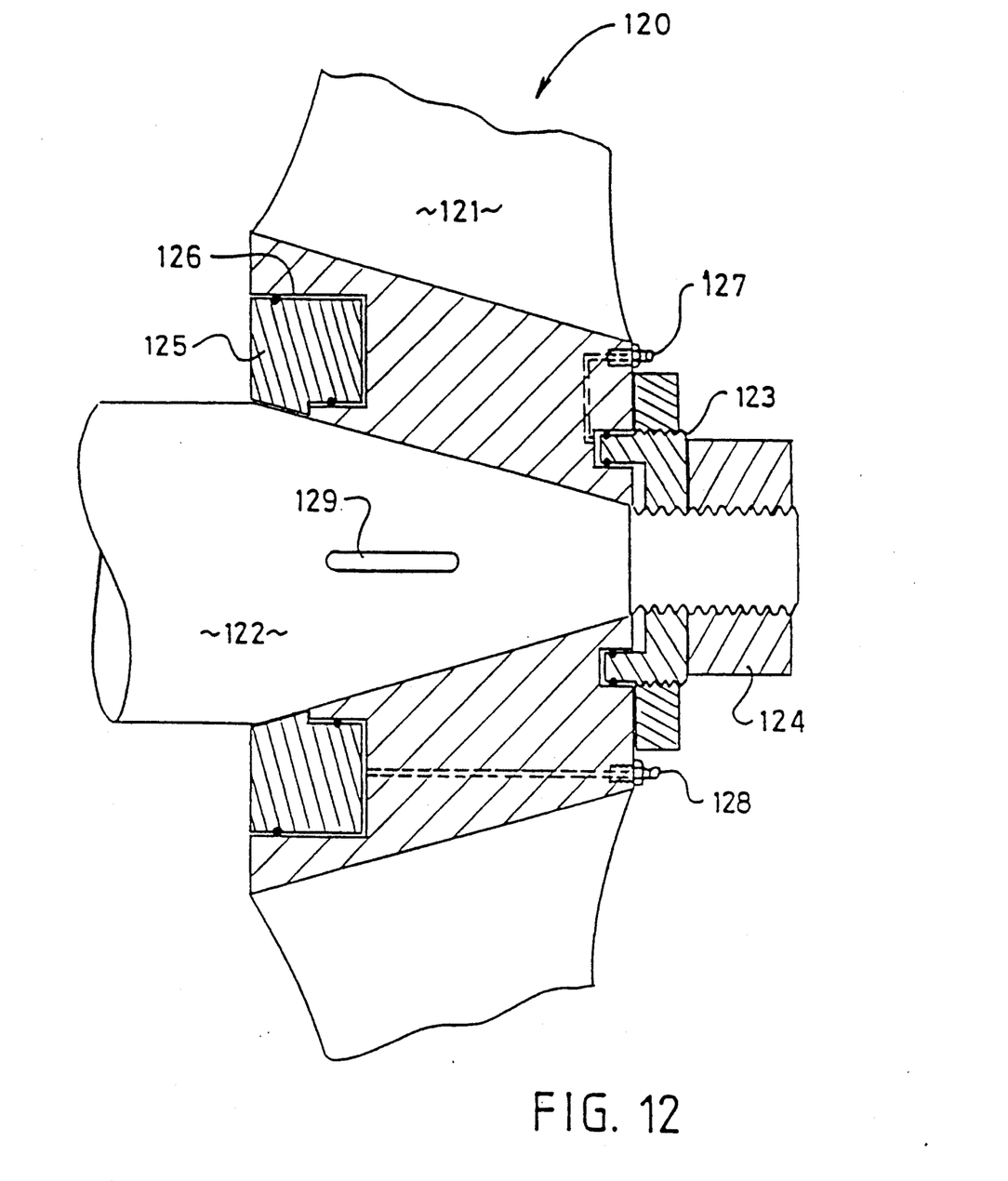
FIG. 12 is a cross-sectional view of a propeller incorporating hydraulic mounting and demounting apparatus.

As shown in FIG. 12, the propeller shaft assembly 120 has a propeller 121 mounted on a shaft 122. A mounting piston 123 bears against a shaft nut 124 attached to the shaft 122 and may be pressurised hydraulically to force the propeller 121 onto the shaft 122. A dismounting piston 125 slides in a cavity 126 in the front of the propeller 121 and may be pressurised to force the propeller 121 along the shaft 122 to dismount it. A grease nipple 127 is connected to the cavity behind the mounting piston 123 and a grease nipple 128 is connected to the cavity 126 behind the dismounting piston 125. A drive key 129 transmits torque between the shaft 122 and the propeller 121.

Figure 13:
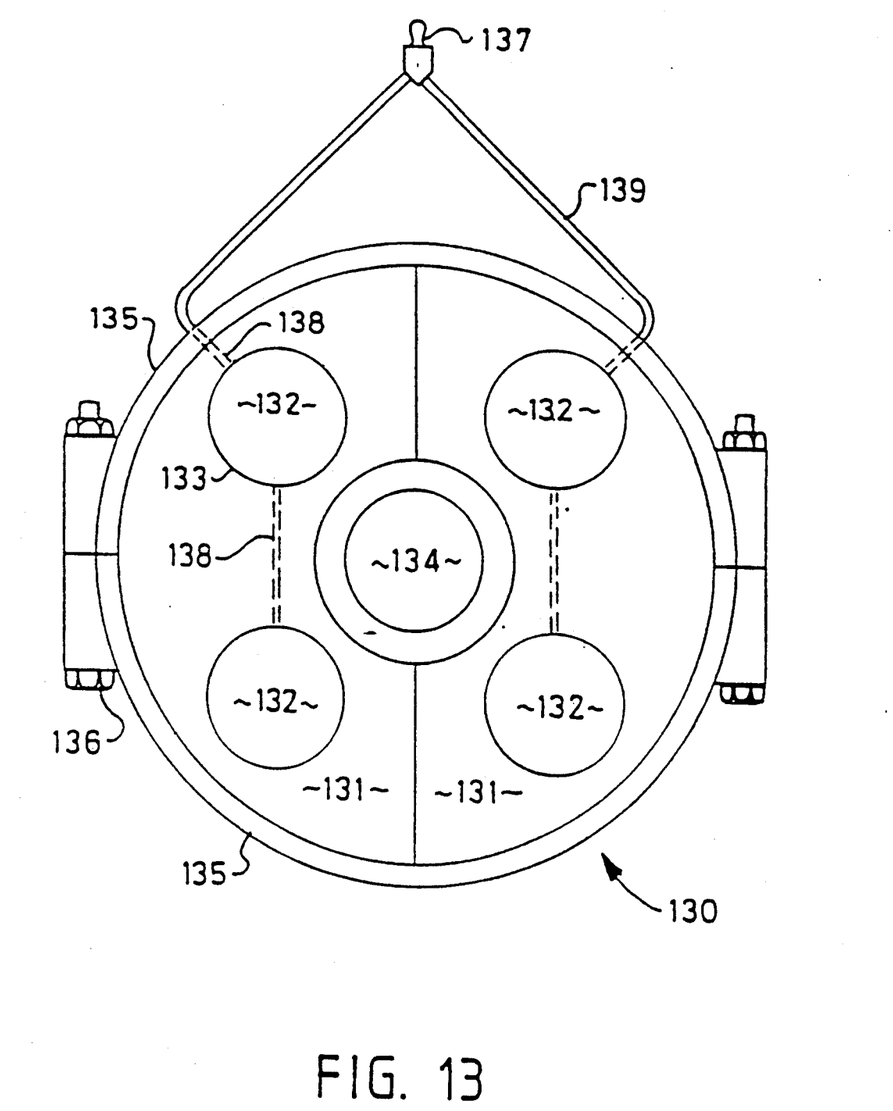
FIG. 13 is a front view of a segmented hydraulic disassembler.
Figure 14:
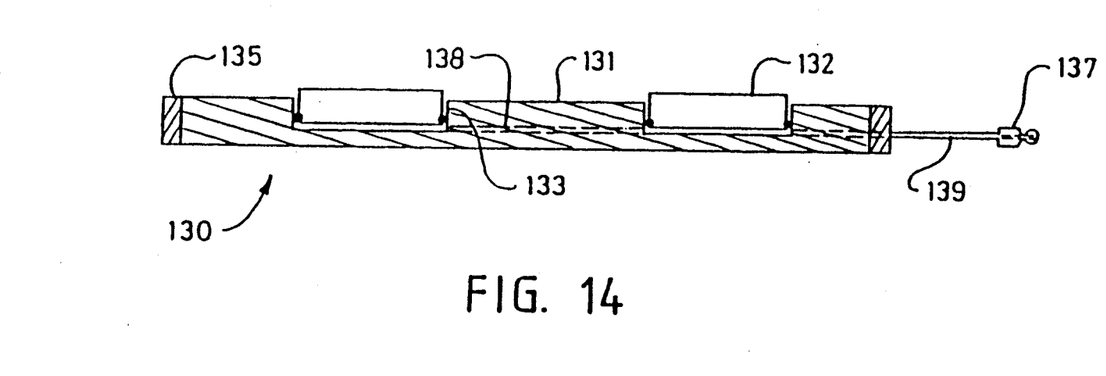
FIG. 14 is a cross-sectional view of the segmented hydraulic disassembler.

The segmented disassembler 130 shown in FIGS. 13 and 14 has two body segments 131 containing pistons 132 in bores 133 within the segments 131. The body segments 131 are clamped around a shaft 134 by clamp segments 135 bolted together with clamp bolts 136. The bores 133 are connected to a grease nipple 137 by internal passages 138 and external pipes 139. In use, the segmented disassembler 130 is assembled in position by placing the segments 131 around a shaft 134 between two components which it is desired to force apart. The clamp segments 135 are assembled around the body segments 131 and bolted together. The pipes 139 are connected together and to grease nipple 137. A grease gun is then applied to the nipple 137 to pressurise the pistons and force the components apart.

Figure 15:
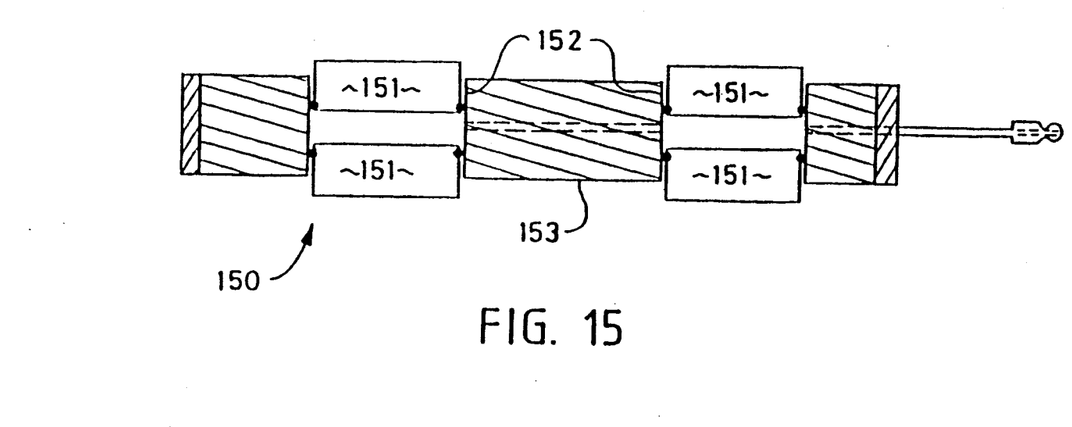
FIG. 15 is a cross-sectional view of a double acting segmented hydraulic disassembler.

The segmented disassembler 150 shown in FIG. 15 is similar to the segmented disassembler 130, except that it has two sets of pistons 151 sliding within bores 152 within the body segments 153 to increase the available stroke of the disassembler 150.

It will of course be realised that while the above has been given by way of illustrative example of this invention, all such and other modifications and variations thereto as would be apparent to persons skilled in the art are deemed to fall within the broad scope and ambit of this invention as is herein set forth.

I claim:

1. A hydraulic nut for applying a load to a threaded tensile member relative to a clamping surface through which the threaded tensile member projects, said hydraulic nut including:

an annular housing having a stepped annular recess extending inwardly from an end face of the annular housing opposite to the clamping surface, the stepped annular recess defining a central bore for the tensile member and forming a cylinder for a piston member, the annular housing having an exterior threaded peripheral locking surface;

a piston having an axial bore therethrough which is threaded to engage, in use, about the threaded tensile member, said piston being of complementary stepped configuration to said stepped recess of said housing whereby said piston is slidably engaged in said housing, the diameter of said piston being greater than the diameter of said housing so as to provide a peripheral flange radially outwardly of the peripheral locking surface of said housing, said flange having a bottom surface which defines a locking face, sealing means provided between the relatively movable surfaces of said housing and said piston, a locking collar having an internal thread engageable with the threaded peripheral locking surface of said housing, said locking collar having an upper end surface engageable with said locking face of said piston member when said locking collar is moved upwardly toward said piston following pressure application;

said stepped annular recess of said housing and said stepped piston member having opposed pressure faces which define therebetween an annular chamber the volume of which depends upon the relative displacement of the piston member relative to the annular housing; and pressure application means communicating through said piston to said annular chamber whereby pressurized fluid may be applied to and expand said annular chamber to displace said piston relative to the said housing and tension said tensile member, whereby, said locking collar can be screwed against said locking face of said piston member so that the expanded annular chamber can be maintained, thus maintaining tension in the tensile member when said pressure is released.

2. The hydraulic nut as claimed in claim 1, wherein the internal thread of said locking collar and the threaded locking surface of said housing when under load engage at faces which are radially perpendicular to axis of the threads.

3. The hydraulic nut as claimed in claim 1, wherein the exterior threaded surface of said housing is a buttress thread.

4. The hydraulic nut as defined in claim 1, wherein said annular housing is formed with a step-like groove disposed between its bore and its pressure face for supporting an internal sealing means, and said stepped piston member is formed with a step-like external seal housing groove disposed between its external wall and its pressure face for supporting an external sealing means.

5. The hydraulic nut of claim 4, wherein said housing defines a lower stepped portion adjacent said bore and adapted to receive a lowermost section of said piston prior to application of pressure, said lowermost section of said piston serving to provide a relatively elongated thread surface for more expedient transfer of the load.

6. The hydraulic nut as defined in claim 1, wherein said pressure application means includes an hydraulic passage extending between said annular chamber and the external surface of said piston, and a grease nipple mounted on an external surface of said piston.

7. The hydraulic nut as defined in claim 6, wherein the radial area of said annular chamber is a selected multiple of the area of the central bore, said multiple being selected such that the tension in the tensile member may be generated by the application to the annular chamber of grease from an automotive grease gun.

* * * * *